United States Patent
Sun et al.

(10) Patent No.: US 10,550,249 B2
(45) Date of Patent: Feb. 4, 2020

(54) PROCESS FOR FOAMING POLYOLEFIN COMPOSITIONS USING A FLUORORESIN AS A NUCLEATING AGENT

(71) Applicant: Dow Global Technologies LLC, Midland, MI (US)

(72) Inventors: Gangwei Sun, Shanghai (CN); Mohamed Esseghir, Lawrenceville, NJ (US); Chester J. Kmiec, Phillipsburg, NJ (US); Lei Ying, Shanghai (CN); Yabin Sun, Shanghai (CN); XianMin Xu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 109 days.

(21) Appl. No.: 15/528,850

(22) PCT Filed: Nov. 28, 2014

(86) PCT No.: PCT/CN2014/092555
§ 371 (c)(1),
(2) Date: May 23, 2017

(87) PCT Pub. No.: WO2016/082210
PCT Pub. Date: Jun. 2, 2016

(65) Prior Publication Data
US 2017/0327676 A1    Nov. 16, 2017

(51) Int. Cl.
| | | |
|---|---|---|
| C08J 3/22 | (2006.01) | |
| C08J 9/00 | (2006.01) | |
| C08J 9/28 | (2006.01) | |
| C08L 23/04 | (2006.01) | |
| C08L 23/06 | (2006.01) | |
| C08L 27/18 | (2006.01) | |
| H01B 3/44 | (2006.01) | |

(52) U.S. Cl.
CPC .............. *C08L 23/06* (2013.01); *C08J 9/283* (2013.01); *H01B 3/441* (2013.01); *C08J 9/0019* (2013.01); *C08J 9/0066* (2013.01); *C08J 2203/06* (2013.01); *C08J 2203/08* (2013.01); *C08J 2323/06* (2013.01); *C08J 2423/06* (2013.01); *C08J 2427/18* (2013.01); *C08L 2203/14* (2013.01); *C08L 2203/206* (2013.01); *C08L 2205/025* (2013.01); *C08L 2205/035* (2013.01); *C08L 2205/24* (2013.01); *C08L 2207/062* (2013.01); *C08L 2207/066* (2013.01); *C08L 2310/00* (2013.01)

(58) Field of Classification Search
CPC ........ C08J 9/0019; C08J 9/0066; C08J 3/226; C08J 9/0061; C08J 9/283; C08J 2201/024; C08J 2203/06; C08J 2203/08; C08J 2323/06; C08J 2423/06; C08L 23/04; C08L 23/06; C08L 27/18; C08L 2203/14; C08L 2203/206; C08L 2207/062; C08L 2207/066; C08L 2310/00; H01B 3/441; H01B 3/445
See application file for complete search history.

(56) References Cited

U.S. PATENT DOCUMENTS

| | | | |
|---|---|---|---|
| 3,554,932 A | | 1/1971 | Overcashier |
| 4,101,445 A | | 7/1978 | Levine et al. |
| 4,302,565 A | | 11/1981 | Goeke et al. |
| 4,508,842 A | | 4/1985 | Beran et al. |
| 4,937,299 A | | 6/1990 | Ewen et al. |
| 5,100,950 A | * | 3/1992 | Carlson ..................... C08L 7/00 523/149 |
| 5,314,925 A | | 5/1994 | Burnell et al. |
| 5,317,036 A | | 5/1994 | Brady, III et al. |
| 5,332,793 A | | 7/1994 | Cann |
| 5,342,907 A | | 8/1994 | Cann et al. |
| 5,371,145 A | | 12/1994 | Daniell et al. |
| 5,405,901 A | | 4/1995 | Daniell et al. |
| 5,410,003 A | | 4/1995 | Bai |
| 5,837,173 A | | 11/1998 | Vita et al. |
| 6,113,822 A | * | 9/2000 | Adedeji ................. C08J 9/0061 264/328.1 |
| 6,121,335 A | | 9/2000 | Higashikubo et al. |
| 6,284,810 B1 | | 9/2001 | Burnham et al. |
| 6,335,490 B1 | | 1/2002 | Higashikubo et al. |
| 6,492,596 B1 | | 12/2002 | Higashikubo et al. |
| 6,512,013 B2 | | 1/2003 | Hrivnak |
| 7,262,226 B2 | | 8/2007 | Abusleme et al. |
| 7,439,297 B2 | | 10/2008 | Abusleme et al. |
| 2004/0220287 A1 | | 11/2004 | Champagne et al. |
| 2007/0059511 A1 | * | 3/2007 | Edwards ............. B29C 44/3469 428/304.4 |
| 2007/0249743 A1 | * | 10/2007 | Sehanobish ............. B29C 44/12 521/134 |
| 2008/0242754 A1 | | 10/2008 | Champagne et al. |
| 2008/0311377 A1 | * | 12/2008 | Marie Van Der Ven ..................... B29C 44/348 428/318.4 |

FOREIGN PATENT DOCUMENTS

| | | |
|---|---|---|
| CN | 103012918 A | 4/2013 |
| EP | 0386663 A1 | 9/1990 |
| JP | H11-199697 A | 7/1999 |
| JP | 2000344927 A | 12/2000 |
| JP | 2001-200085 A | 7/2001 |
| JP | 2006339099 A | 12/2006 |

* cited by examiner

Primary Examiner — Melissa A Rioja

(57) ABSTRACT

A polyolefin composition is foamed by a process in which a nucleator is used, and the nucleator comprises 80% or more of unagglomerated fluororesin particles and/or agglomerates of fluororesin particles in which both the unagglomerated particles and the agglomerates are less than 1 μm in size.

8 Claims, 3 Drawing Sheets

PROCESS FOR FOAMING POLYOLEFIN COMPOSITIONS USING A FLUORORESIN AS A NUCLEATING AGENT

FIELD OF THE INVENTION

This invention relates to a process of foaming compositions. In one aspect the invention relates to foaming polyolefin compositions using a fluororesin as a nucleating agent while in another aspect, the invention relates to the foamed composition made from the process. In yet another aspect, the invention relates to using the foamed compositions as an insulation layer in electric communication cables, particularly high frequency coaxial cables.

BACKGROUND OF THE INVENTION

Typically, the insulation layer of a high frequency telecom cable is produced by mixing a nucleating agent with a mixture of high density polyethylene (HDPE) and low density polyethylene (LDPE). The foamable materials are then extruded in the presence of a physical foaming agent, likegases such as nitrogen, carbon dioxide, chlorinated fluorocarbons, freons, helium, neon, argon, krypton, xenon, and radon, which is injected into the polymer melt inside of the extruder. Nucleating agents for the foaming include azodicarbonamide (ADCA) and 4,4'-oxybisbenzenesulfonylhydrazide (OBSH), which thermally decompose in an extruder and form a number of fine nuclei in the polymer melt. However, the byproducts of the decomposed ADCA and OBSH have a high polarity which are well known to have a significant negative effect on the electrical performance (dissipation factor).

Compared to ADCA and OBSH, fluororesin powder, such as polytetrafluoroethylene (PTFE), is a nucleating agent that exhibits a significantly lesser effect on electrical performance and is free of the decomposition issues associated with ADCA and OBSH. PTFE has been and is currently used as a nucleating agent for foaming compositions for use as insulation in telecom cable but improvements are still desired, particularly with respect to dispersion of the nucleating agent within the foamable composition, i.e., the polymer matrix, and in the formation of small, uniformly sized cells within the foamed product.

The dispersion efficiency of nucleator in a polymer matrix is largely determined by the particle size and particle size distribution of the nucleator. U.S. Pat. No. 3,554,932A teaches that finely divided, solid fluororesins, such as PTFE, fluorinated ethylene-propylene (FEP), or particle carriers coated with a fluorocarbon functioned as nucleators for gas injected, foamed thermoplastic. It also teaches that the particle size should not exceed 20 microns in diameter, and it should be used in an amount from 0.01% to 2% by weight.

EP386663 teaches that fluorocarbon powder used as a nucleator should have an average particle size from 0.1 to 5 microns (µm).

U.S. Pat. No. 6,121,335 teaches a nucleator for foaming, the nucleator comprising a fluororesin powder comprising particles have a particle size of 0.1-0.5 µm in a proportion of at least 50% by number and containing particles having a particle size of not less than 5 µm in a proportion of not more than 40% by number.

U.S. Pat. No. 7,262,226 teaches using as nucleating agent tetrafluoroethylene homopolymer (PTFE) having a number average molecular weight lower than 1,000,000, preferably lower than 500,000. The nucleating agent is obtained by irradiating with gamma rays or electron beam PTFE powders produced by dispersion or suspension polymerization processes and then milling the irradiated powders. With the dispersion polymerization processes, latexes having a particle size of 0.1-0.3 micron are obtained. After coagulation the powder particle sizes increase to about 100-500 micron. The powders are irradiated with gamma rays and then milled to obtain powders having final particle sizes lower than 15 micron. With the suspension polymerization processes, powders having particle sizes of 2-5 mm are obtained. These powders are irradiated with electron beam and then milled to obtain powders having a final particle size lower than 15 micron.

None of these references teach or recognize the benefit of reducing the size of fluororesin nucleating agent agglomerates (produced dispersion polymerization) of greater than 1 micron, typically greater than 5 microns, to less than 1 micron prior to using the agents for foaming polyolefin compositions, particularly polyolefin resins comprising or consisting essentially of HDPE and LDPE. Moreover, none of these references teach or recognize the benefit of preparing the foaming composition by batch mixing (e.g., kneading) the nucleating agent of reduced size, e.g., less than 1 micron, with the polyolefin resin. These submicronucleating agents are more uniformly dispersed within the foaming composition (as opposed to a foaming composition alike in all aspects but prepared by extrusion mixing), and the foaming composition thus provides superior foaming performance and a superior foamed product, e.g., a foamed product with a desirable fine cell structure.

SUMMARY OF THE INVENTION

In one embodiment the invention is a process for foaming a polyolefin composition, the process comprising the step of using a nucleator comprising 80%, or 85%, or more of unagglomerated fluororesin particles and/or agglomerates of fluororesin particles in which both the unagglomerated particles and the agglomerates are submicron in size (i.e., less than 1 micron (µm), typically no larger than 0.5 µm, more typically no larger than 0.3 µm, in size). In one embodiment the fluororesin nucleator is prepared by dispersion polymerization. In one embodiment the foamable polyolefin composition is formed by batch mixing the fluororesin nucleator and a polyolefin.

In one embodiment the invention is a process for foaming a polyolefin composition using a fluororesin nucleating agent comprising 80%, or 85%, or more of agglomerates of 5 microns or more in size, the agglomerates comprising submicron particles, the process comprising the steps of: (A) reducing the size of the agglomerates to produce a fluororesin nucleating agent comprising 80%, or 85%, or more of particles or agglomerates of less than 1 micron in size, (B) mixing the nucleating agent of (A) with a polyolefin to produce a foamable composition, and (C) foaming the foamable composition. In one embodiment the nucleating agent of (B) and the polyolefin are batched mixed.

In one embodiment the invention is a process for foaming a polyolefin composition, the process comprising the steps of: (A) preparing a masterbatch of a polyolefin and a fluororesin in which (1) the fluororesin comprises from 1 to 50 weight percent of the masterbatch, and (2) a majority, typically 80%, or 85%, or more, of the fluororesin comprising agglomerates of submicron fluororesin particles, the agglomerates of 5 µm or larger in size, (B) reducing the size of the fluororesin agglomerates such that 80%, or 85%, or more of the fluororesin in the masterbatch comprises or consists essentially of fluororesin agglomerates or fluororesin particles of a size less than 1 µm, or less than 0.5 µm, or less than 0.3 µm, (C) mixing the masterbatch of (B) with a polyolefin to form a mixture of the fluororesin substantially uniformly dispersed throughout the polyolefin, and (D) foaming the mixture of (C). In one embodiment the fluororesin is prepared by dispersion polymerization. In one embodiment the mixture of (C) is prepared by batch mixing.

In one embodiment the invention is a polyolefin foam made by a process comprising the steps of: (A) reducing the size of the agglomerates to produce a fluororesin nucleating agent comprising 80%, or 85%, or more of particles or agglomerates of less than 1 micron in size, (B) mixing the nucleating agent of (A) with a polyolefin to produce a foamable composition, and (C) foaming the foamable composition. In one embodiment the nucleating agent of (B) and the polyolefin are batched mixed.

In one embodiment the invention is a polyolefin foam made by a process of foaming a polyolefin composition, the process comprising the steps of: (A) preparing a masterbatch of a polyolefin and a fluororesin in which (1) the fluororesin comprises from 1 to 50 weight percent of the masterbatch, and (2) a majority, typically 80%, or 85%, or more, of the fluororesin comprising agglomerates of submicron fluororesin particles, the agglomerates of 5 µm or larger in size, (B) reducing the size of the fluororesin agglomerates such that 80%, or 85%, or more of the fluororesin in the masterbatch comprises or consists essentially of fluororesin agglomerates or fluororesin particles of a size less than 1 µm, or less than 0.5 µm, or less than 0.3 µm, (C) mixing the masterbatch of (B) with a polyolefin to form a mixture of the fluororesin substantially uniformly dispersed throughout the polyolefin, and (D) foaming the mixture of (C). In one embodiment the fluororesin is prepared by dispersion polymerization. In one embodiment the mixture of (C) is prepared by batch mixing.

In one embodiment the invention is a cable comprising an insulation layer comprising a foam made by any of the previously described processes of foaming a polyolefin composition.

In one embodiment the invention is a masterbatch comprising or consisting essentially of a polyolefin and a fluororesin in which (1) the fluororesin comprises from 1 to 50 weight percent of the masterbatch, and (2) a majority, typically 80%, or 85%, or more, of the fluororesin comprises agglomerates of fluororesin particles and/or unagglomerated fluororesin particles, both the agglomerates and the unagglomerated particles of submicron size. In one embodiment the fluororesin is prepared by dispersion polymerization.

In one embodiment the invention is a foamable composition comprising, or consisting essentially of, in weight percent based on the weight of the composition:
(A) 45 to 95% HDPE;
(B) 4 to 54% LDPE; and
(C) 0.01 to 1% of PTFE comprising 80%, or 85%, or more of agglomerates of PTFE particles and unagglomerated PTFE particles, both the agglomerates and the unagglomerated particles of submicron size;
the PTFE prepared by dispersion polymerization and the composition prepared by batch mixing the HDPE, LDPE and PTFE.

DETAILED DESCRIPTION OF THE PREFERRED EMBODIMENT

Definitions

Figure 1A:
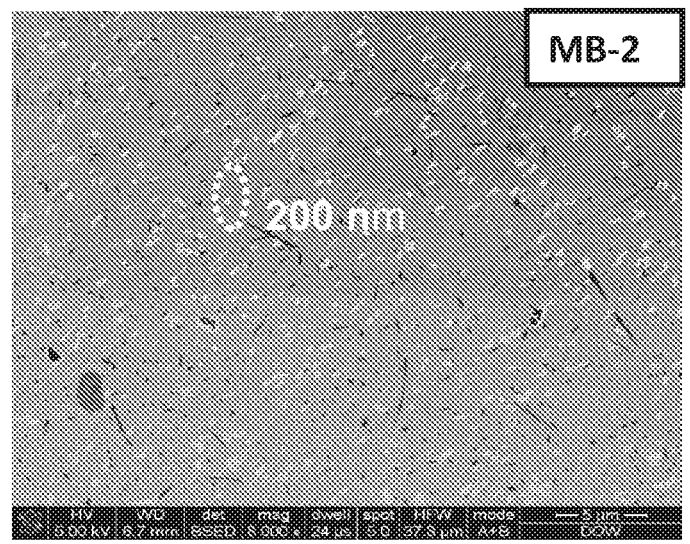
FIG. 1A is a scanning electron microscope (SEM) image of the composition prepared in Example 1 and comprising PTFE submicron agglomerates and submicron unagglomerated particles dispersed in a polyethylene matrix.

Unless stated to the contrary, implicit from the context, or customary in the art, all parts and percents are based on weight and all test methods are current as of the filing date of this disclosure. Density is measured by ASTM D-792, and MI by ASTM D-1238, (190° C./2.16 kg).

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate unless otherwise indicated. Numerical ranges include all values from and including the lower and the upper values, in increments of one unit, provided that there is a separation of at least two units between any lower value and any higher value. As an example, if a compositional, physical or other property, such as, for example, tensile strength, elongation at break, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, particle size and the amount of individual ingredients in a mixture.

"Comprising," "including," "having" and like terms are not intended to exclude the presence of any additional component, step or procedure, whether or not the same is specifically disclosed. In order to avoid any doubt, all processes claimed through use of the term "comprising" may include one or more additional steps, pieces of equipment or component parts, and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or," unless stated otherwise, refers to the listed members individually as well as in any combination.

"Composition" and like terms mean a mixture of two or more materials.

"Polyolefin composition" and like terms mean, in the context of this invention, a composition comprising at least one polyolefin.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Nucleator", "nucleating agent" and like terms mean, in the context of this invention, a substance, typically a small particle, that provides a nucleation site for bubble formation within a polymer melt.

"Agglomerate" and like terms mean a collection of two or more particles group together to constitute a whole. Agglomerates can be of various sizes. An agglomerate will always be larger than the particles from which it is made, but some particles not associated with a particular agglomerate can be larger than the agglomerate. In the practice of this invention, starting agglomerates, i.e., as received from a manufacturer or supplier, are typically greater than 5 microns in size, and are typically and preferably reduced in size to less than one micron, more preferably less than 0.5 micron and even more preferably less than 0.3 micron, prior to the mixing with and/or foaming of the polyolefin composition.

"Particle" and like terms mean a unitary mass. Particles can be of various sizes. A fluororesin particle, e.g., a PTFE particle, is a unitary mass of fluororesin. Two or more fluororesin particles grouped together, i.e., in contact with one another, form a fluororesin agglomerate. The fluororesin particles of this invention are typically and preferably less than one micron is size, more preferably less than 0.5 micron and even more preferably less than 0.3 micron, in size.

"Unagglomerated particle" and like terms mean a particle not associated with another particle of like kind. Unagglomerated particles include both particles that have dissociated from an agglomerate, and particles that have not been associated with an agglomerate.

"Masterbatch" and like terms mean a concentrated mixture of additives in a carrier resin. In the context of this invention, a masterbatch comprises a concentrated mixture of fluororesin nucleator in a polyolefin resin. The masterbatch allows for an efficient addition and dispersion of the nucleator to and in the polyolefin. The manufacture and use of master batches are well known to those skilled in the art of manufacturing and fabricating plastics and foam articles. Polyolefins "Polyolefin" and like terms means a polymer derived from one or more simple olefin monomers, e.g., ethylene, propylene, 1-butene, 1-hexene, 1-octene and the like. The olefin monomers can be substituted or unsubstituted and if substituted, the substituents can vary widely. If the polyolefin is to contain unsaturation, then preferably at least one of the comonomers is at least one nonconjugated diene such as 1,7-octadiene, 1,9-decadiene, 1,11-dodecadiene, 1,13-tetradecadiene, 7-methyl-1,6-octadiene, 9-methyl-1,8-decadiene and the like. Many polyolefins are thermoplastic. Polyolefins include but are not limited to polyethylene, polypropylene, polybutene, polyisoprene and their various interpolymers.

In one embodiment of the invention the polyolefin is at least one of, preferably a blend of, high density polyethylene (HDPE) and low density polyethylene (LDPE). The HDPE resins that can be used in the practice of this invention are well known, commercially available, and can be prepared with either Ziegler-Natta, chromium-based, constrained geometry or metallocene catalysts in slurry reactors, gas phase reactors or solution reactors. HDPE, as used herein, is an ethylene-based homopolymer or interpolymer having a density of at least 0.94 g/cc, or from at least 0.94 g/cc to 0.98 g/cc, and a melt index (MI, $I_2$) from 0.1 g/10 min to 25 g/10 min.

HDPE can comprise ethylene and one or more $C_3$-$C_{20}$ α-olefin comonomers. The comonomer(s) can be linear or branched. Nonlimiting examples of suitable comonomers include propylene, 1-butene, 1 pentene, 4-methyl-1-pentene, 1-hexene, and 1-octene. HDPE interpolymer includes at least 50 percent by weight units derived from ethylene, i.e., polymerized ethylene, or at least 70 percent by weight, or at least 80 percent by weight, or at least 85 percent by weight, or at least 90 weight percent, or at least 95 percent by weight ethylene in polymerized form.

In an embodiment, HDPE is a homopolymer or an ethylene/α-olefin copolymer with a density from 0.94 g/cc to 0.98 g/cc, and a melt index from 0.1 g/10 min to 10 g/10 min. In an embodiment, the HDPE has a density from 0.960 g/cc to 0.980 g/cc, and a melt index from 0.1 g/10 min to 10 g/10 min. In an embodiment, HDPE has a density from 0.96 g/cc to 0.97 g/cc and a melt index from 0.1 g/10 min to 10 g/min. In an embodiment, the HDPE has a density from 0.96 g/cc to 0.98 g/cc and a melt index from 1.0 g/10 min to 10.0 g/10 min.

Nonlimiting examples of suitable, commercially available HDPE include but are not limited to DOW High Density Polyethylene resins and CONTINUUM™ and UNIVAL™ high density polyethylene resins, ELITE™ 5960G, HDPE KT 10000 UE, HDPE KS 10100 UE and HDPE 35057E, each available from The Dow Chemical Company Midland, Mich., USA; SURPASS™ available from Nova Chemicals Corporation, Calgary, Alberta, Canada; BS2581 available from Borealis; Hostalen ACP 5831D available from Lyondell/Basell; RIGIDEX® HD5502S available from INEOS Olefins & Polymers Europe; SABIC® B5823 and SABIC® B5421 available from Sabic; and HDPE 5802 and BM593 available from Total.

The LDPE resins that can be used in the practice of this invention are also well known, commercially available, and made by any one of a wide variety of processes including, but not limited to, solution, gas or slurry phase, and high pressure tube or autoclave. The polyethylene also can be homogeneous or heterogeneous with respect to comonomer distribution. The homogeneous polyethylenes usually have an essentially uniform comonomer distribution. The heterogeneous polyethylenes, on the other hand, do not have a uniform comonomer distribution. In one embodiment the LDPE is a linear low density polyethylene (LLDPE). In one embodiment the LDPE is a very low density polyethylene (VLDPE).

The polyethylene can have a broad molecular weight distribution, characterized by a polydispersity (Mw/Mn) greater than 3.5, or a narrow molecular weight distribution, characterized by a polydispersity (Mw/Mn) in the range of about 1.5 to about 3.5. Mw is defined as weight average molecular weight, and Mn is defined as number average molecular weight. They can be a single type of polyethylene or a blend or mixture of more than one type of polyethylene. Thus, it may be characterized by either single or multiple DSC melting points. The polyethylenes can have a density in the range of 0.865 to 0.930 gram per cubic centimeter (g/cc), and preferably have a density in the range of 0.900 to 0.925 g/cc. They also can have a melt index (MI, $I_2$) in the range of 0.1 to 50 grams per 10 minutes (g/10 min). Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. No. 4,508,842 (heterogeneous polyethylenes) and U.S. Pat. Nos. 5,332,793; 5,342,907; and 5,410,003 (homogeneous polyethylenes); a chromium based catalyst system such as that described in U.S. Pat. No. 4,101,445; a metallocene catalyst system such as that described in U.S. Pat. Nos. 4,937,299 and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylenemade by high pressure processes (HP-LDPE), and high density polyethylene (HDPE) having a density greater than 0.940 g/cc. A conventional high pressure process is described in *Introduction to Polymer Chemistry*, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi (about 69 to about 207 MPa) and the temperature is in the range of about 175° C. to about 250° C., and in the tubular reactor, the pressure is in the range of about 25,000 to about 45,000 psi (about 170 to about 310 MPa) and the temperature is in the range of about 200° C. to about 350° C.

Commercially available LDPE resins include but are not limited to DOW Low Density Polyethylene resins available from The Dow Chemical Company such as DFDB-1258 NT and, in general, any fractional melt flow index (MFI) resin for use in heavy duty bags or agricultural films such as those available from Borealis, Basel, Sabic and others.

The HDPE/LDPE mixtures or blends of the present invention may be prepared by any suitable means known in the art such as, for example, dry blending in a pelletized form in desired proportions followed by melt blending in an apparatus such as a screw extruder or a BANBURY™ mixer. Dry blended pellets may be directly melt processed into a final solid state article by, for example, extrusion or injection molding. The blends may also be made by direct polymerization. Direct polymerization may use, for example, one or more catalysts in a single reactor or two or more reactors in series or parallel and vary at least one of operating conditions, monomer mixtures and catalyst choice.

The amount of HDPE in the polyolefin composition, based on the weight of the composition, is typically at least 45 weight percent (wt %), more typically at least 55 wt % and even more typically at least 60 wt %. The amount of HDPE in the polyolefin composition, based on the weight of the composition, typically does not exceed 95 wt % more typically it does not exceed 85 wt % and even more typically it does not exceed 80 wt %.

The amount of LDPE in the polyolefin composition, based on the weight of the composition, is typically at least 4 weight percent (wt %), more typically at least 14 wt % and even more typically at least 19 wt %. The amount of LDPE in the polyolefin composition, based on the weight of the composition, typically does not exceed 54 wt %, more typically it does not exceed 44 wt % and even more typically it does not exceed 39 wt %.

The HDPE component of the blend can comprise two or more grades of HDPE, and the LDPE component of the blend can comprise two or more grades of LDPE. The HDPE/LDPE blend typically has an $I_2$ of 0.1 to 4 g/10 min, more typically 0.15 to 4 g/10 min.

Fluororesins

The fluororesin constituting the nucleator of the present invention may be various polymers inclusive of a homopolymer and a copolymer of fluorine-containing monomers. Examples of fluororesin that can be used in the practice of this invention include but are not limited to polytetrafluoroethylene (PTFE), tetrafluoroethylene-perfluoroalkyl vinyl ether copolymer (PFA), ethylene tetrafluoroethylene copolymer (ETFE), tetrafluoroethylene-hexafluoropropylene copolymer (FEP), tetrafluoroethylene-ethylene copolymer, polyvinylidene fluoride (PVdF), polychlorotrifluoroethylene (PCTFE), chlorotrifluoroethylene-ethylene copolymer (ECTFE) and the like. PTFE, PFA and ETFE are preferred and PTFE is particularly preferred.

In one embodiment the fluororesin is prepared by dispersion polymerization (as opposed to suspension polymerization). Dispersion polymerization typically produces fluororesin particles of submicron size, e.g., 0.1-0.3 microns, and these particles tend to agglomerate, often into agglomerates of 5 microns or larger in size. One embodiment in the practice of the process comprises the step of reducing the size of such fluororesin agglomerates to agglomerates of submicron size and/or into the individual submicron particles that form the agglomerate, this size reduction performed prior to foaming the mixture of the fluororesin nucleator and polyolefin. In one embodiment the fluororesin nucleator and polyolefin are mixed, preferably batch mixed, after the fluororesin agglomerates have undergone size reduction.

While the shape of the fluororesin particles, typically in the bulk form of a powder, is not particularly limited, it is preferable that the particles are primarily sphere-like in shape to produce a foam comprising fine cells and superior uniform foaming.

Nucleators

Fluororesin particles, particularly those of less than a micron in size, tend to agglomerate. In one embodiment of the invention, the nucleator is at least one fluororesin, preferably PTFE. Some commercially available fluororesin powders, particularly those made by dispersion polymerization, comprise a high concentration of agglomerates of at least 5 microns (μm) in size, e.g., diameter. Typically the size of the agglomerates range from 4 to 50 microns, more typically from 5 to 20 microns and even more typically from 5 to 15 microns. Typically, the amount of nucleator particles of at least 5 µm in size in these powders is at least 80%, more typically at least 82%, and even more typically at least 85%. These powders do not disperse well in many polyolefins, e.g., HDPE and/or LDPE.

While agglomerated fluororesin particles, i.e., agglomerates, can be used in the practice of this invention (subject to the size distribution of less than one micron, preferably less than 0.5 micron and more preferably less than 0.3 micron), the use of unagglomerated particles are preferred. Accordingly, the fluororesin nucleators used in this invention are typically unagglomerated particles which may be commingled with agglomerates that were either originally submicron in size or were reduced in size from greater than a micron to less than a micron The practice of the invention can tolerate the presence of some (e.g., less than 10%, or 9%, or 8%, or 7%, or 6%, or 5%, or 4%, or 3%, or 2%, or 1% of the total particles and/or agglomerates mixed with the polyolefin) particles and/or agglomerates that are greater than a micron in size, but the smaller the amount of such particles and/or agglomerates, the better the dispersion of the particles and agglomerates in the polyolefin, and the more evenly distributed are the cell sizes in the foamed product.

Agglomerated particles can be separated from one another by any conventional means, e.g., grinding, mixing or stirring (typically at a relatively high speed), etc. In one embodiment the fluororesin nucleator comprising agglomerates of one micron or greater, typically of 3, or 4, or 5 microns or greater, is subjected to any procedure, treatment, etc. that will reduce the majority, preferably 80%, 82%, 85%, 90% or more, of the such agglomerates to either unagglomerated particles of less than a micron in size, or agglomerates of less than a micron in size before the nucleator is mixed with the polyolefin.

In one embodiment the fluororesin nucleator comprising agglomerates of one micron or greater, typically of 3, or 4, or 5 microns or greater, is first mixed with the polyolefin to form a masterbatch, and then the masterbatch is subjected to any procedure, treatment, etc. that will reduce the majority, preferably 80%, 82%, 85%, 90% or more, of the such agglomerates to either unagglomerated particles of less than a micron in size, or agglomerates of less than a micron in size. Typically the masterbatch comprises from 1 to 50, more typically from 5 to 50 and even more typically from 10 to 20 weight percent (wt %) nucleator, and from 50 to 99, more typically from 70 to 95 and even more typically from 80 to 90 wt % polyolefin. After the masterbatch is subjected to the nucleator size reduction procedure, treatment, etc., the masterbatch is mixed with the polyolefin to be foamed under conditions and for a sufficient period of time to uniformly disperse the unagglomerated particles and agglomerates within the polyolefin before the start of the foaming process.

In one embodiment the fluororesin nucleator comprising agglomerates of one micron or greater, typically of 3, or 4, or 5 microns or greater, is first mixed with the polyolefin in the amount desired for the practice of the foaming process, and then the polyolefin is subjected to any procedure, treatment, etc. for a sufficient amount of time that will both (1) reduce the majority, preferably 80%, 82%, 85%, 90% or more, of the such agglomerates to either unagglomerated particles of less than a micron in size, or agglomerates of less than a micron in size, and (2) substantially uniformly disperse these unagglomerated particles and reduced agglomerates within the polyolefin before the foaming process commences.

The nucleator, particularly PTFE of the particle size distribution described above, can be added to the polyolefin composition comprising or consisting essentially of HDPE and LDPE, by any conventional means. The nucleator can be added neat, in combination with one or more other additives, e.g., antioxidant, cell stabilizer, etc., or as part of a masterbatch. The nucleator is mixed with the polyolefin composition to achieve an essentially homogeneous dispersion of nucleator in the polyolefin composition and to this end, batch mixing, e.g., through the use of a BUSS™ kneader, is typically preferred to mixing in an extruder. If the nucleator is first mixed with the polyolefin composition in an extruder, then it is typically added to the polyolefin composition prior to injection of the gas for foaming.

The amount of the nucleator added to the polyolefin composition is typically from 0.01 to 1 wt %, more typically from 0.05 to 0.5 wt % and even more typically from 0.1 to 0.3 wt % based on the weight of the polyolefin composition.

Particle size can be determined by any method known in the art. In one embodiment, the determination of particle size and proportion (% by number) of fluororesin powder can be determined as follows. A dispersion comprising a fluororesin powder obtained by a dispersing treatment for about 2 minutes under ultrasonication of about 35-40 kHz and ethanol, wherein the fluororesin powder is contained in an amount to make a laser permeation (proportion of output light to incident light) of the dispersion 70-95%, is subjected to a microtrack particle size analyzer under relative refraction (determination is done based on the ratio of diffraction ratio (about 0.99) of fluororesin powder to that of ethanol or according to the measure of the above-mentioned particle size analyzer which is the nearest to the ratio (e.g., 1.02)) and flow type cell measurement mode to determine particle size ($D_1, D_2, D_3 \ldots$) of individual particles and the number ($N_1, N_2, N_3 \ldots$) of particles having each particle size based on the optical diffraction of the laser. In this case, the particle size (D) of individual particles is automatically measured by the microtrack particle size analyzer wherein particles having various shapes are measured in terms of the diameters of the corresponding spheres. Therefore, the proportion (% by number) of the particle size $D_1$ is expressed by the percentage of the number of these particles ($N_1$) to the number of the entire particles ($\Sigma N$). The proportion of the particles having a particle size of 0.1-0.5 µm is expressed by the percentage of the number of the particles having a particle size of 0.1-0.5 µm to the total number of the existing particles ($\Sigma N$). Similarly, the proportion of the particles having a particle size of not less than 5 µm is expressed by the percentage of the number of the particles having a particle size of not less than 5 µm to the total number of the existing particles ($\Sigma N$). On the other hand, the average particle size of the nucleator of the present invention can be calculated using the total number of existing particles ($\Sigma N$) and the total of the product of the cube of the particle size of respective particles and the total number of existing particles ($\Sigma ND^3$), according to the following formula Average Particle Size (µm)=$(\Sigma ND^3/\Sigma N)^{1/3}$ Calculation of particle size is further illustrated in U.S. Pat. No. 6,121,335.

Additives

The polyolefin composition used in this invention may contain one or more additives as necessary or desired. Representative additives include but are not limited to, processing aids, lubricants, stabilizers (antioxidants), foaming aids, nucleating agents, surfactants, flow aids, viscosity control agents, coloring agents, copper inhibitors and the like. These additives can be added to the polymer(s) either before or during processing. The amount of any particular additive in the polyolefin composition is typically from 0.01 to 1 wt %, more typically from 0.01 to 0.5 wt % and even more typically from 0.01 to 0.3 wt %, and the total amount of additives in the polyolefin composition, if present at all, is typically from 0.01 to 5 wt %, more typically from 0.01 to 2 wt % and even more typically from 0.01 to 1 wt %.

Foaming Agent

The foaming agent is one or more suitable for the extrusion temperature, foaming conditions, foam forming method and the like. When an insulating foam layer in the final form is to be formed simultaneously with extrusion forming, for example, an inert gas such as nitrogen, a carbon gas (e.g., CO, $CO_2$, etc.), helium, argon and the like, hydrocarbon such as methane, propane, butane, pentane and the like, halogenated hydrocarbons such as dichlorodifluoromethane, dichloromonofluoromethane, monochlorodifluoromethane, trichloromonofluoromethane, monochloropentafluoroethane, trichlorotrifluoroethane and the like are used. The amount of the foaming agent to be used can vary. Typically, it is 0.001-0.1 part by weight, more typically 0.005-0.05 part by weight, per 100 parts by weight of the polyolefin composition to be foamed. The foaming agent may be mixed with an organic polymer to be foamed in advance or may be supplied into an extruder from a foaming agent supply opening formed on the barrel of the extruder.

Foaming Process

The polyolefin composition of this invention is foamed using known methods and known equipment. Typically, a foam is produced by extruding the polyolefin composition containing a nucleator using an extruder operated under foaming extrusion conditions, e.g., injection of a foaming agent while the composition is in a high pressure zone and then extruding the composition to a low pressure zone. Foaming process are further described by C. P. Park in *Polyolefin Foam*, Chapter 9, *Handbook of Polymer Foams and Technology*, edited by D. Klempner and K. C. Frisch, Hanser Publishers (1991).

In one embodiment, a typical extrusion foaming process uses an atmospheric gas (e.g., $CO_2$) to produce a foamed cable insulation as described in CA 2 523 861 C, *Low Loss Foam Composition and Cable Having Low Loss Foam Layer*. Dissolution of the foaming gas into the polymer melt is governed by Henry's law as reported for example in the work of H. Zhang (below) and others. Solubility is a function of the saturation pressure and the Henry's law constant, which itself is a function of temperature. /Zhang_Hongtao_201011_MASc_thesis.pdf. Also see *Foam Extrusion: Principles and Practice* by Shau-Tarng Lee, editor. The MuCell® microcellular foam injection molding technology is an example of a commercially practiced foaming process, and it is described generally in U.S. Pat. No. 6,284,810.

Given the above on the importance of adequate pressure control during foaming extrusion, a suitable process would be the one commercially referred to as the MuCell process, in which adequate pressures are built via specific hardware design, for effective nucleation as reported in U.S. Pat. No. 684,810B1. The method disclosed in this publication relies solely on high pressure drops (dP/dt) for self-nucleation of the foaming gas in the absence of an "auxiliary nucleating agent" (Col. 4, line 25-30).

Embodiments of the Invention

In one embodiment the nucleator is prepared by dispersion polymerization

In one embodiment the foaming composition is prepared by batch mixing.

In one embodiment the polyolefin composition comprises at least two polyolefins.

In one embodiment the polyolefin composition consists essentially of two polyolefins.

In one embodiment the polyolefins of the polyolefin composition are an HDPE and a LDPE.

In one embodiment the polyolefin composition includes at least one nucleator.

In one embodiment the polyolefin composition includes at least one of an antioxidant and a cell stabilizer.

In one embodiment the polyolefin composition comprises HDPE, LDPE and PTFE.

SPECIFIC EMBODIMENTS

The following experiments are provided to illustrate various embodiments of the invention. They are not intended to limit the invention as otherwise described and claimed. All numerical values are approximate.

Example 1 and Comparative Example 1

Materials

LDPE-1 is a low density polyethylene (LDPE) with an MI of 2.3 g/10 min (ASTM D-1238, (190° C./2.16 kg)) and a density of 0.92 g/cc (ASTM D-792).

PTFE-1 is ZONYL™ MP 1400, a white, free-flowing PTFE with an average particle size of 10 μm and available from DuPont.

PTFE-2 is ZONYL™ MP 1600, a white, free-flowing PTFE with an average particle size distribution of 7 m and available from DuPont.

SONGNOX™ 1024 FG is 2',3-bis[[3-[3,5-di-tert-butyl-4-hydroxyphenyl]-propionyl]]propionohydrazide, an antioxidant available from Songwon International Americas, Inc.

LDPE-2 is DFDB-1258 NT, a low density polyethylene (LDPE) with an MI of 6 g/10 min (ASTM D-1238, (190° C./2.16 kg)) and a density of 0.922 g/cc (ASTM D-792) available from The Dow Chemical Company.

HDPE is DGDA-6944 NT, a high density polyethylene (HDPE) with an MI of 8 g/10 min (ASTM D-1238, (190° C./2.16 kg)) and a density of 0.965 g/cc (ASTM D-792) available from The Dow Chemical Company.

Dispersion Efficiency

Preparation

Preparation follows a two-step approach in which, first, a higher concentration masterbatch (MB) is made in a batch mixing operation using an internal mixing bowl (BRABENDER™ model Prep Mixer/Measuring Head laboratory electric batch mixer equipped with cam blades), followed by dilution in a twin-screw extruder. Each trial begins using a conventional mixing cycle addition in which the polymers are added first then followed by incremental addition of PTFE powder and antioxidants. The process temperature set point is 120° C. and the mixer loading speed is 35 revolutions per minute (rpm). Once the polymer resin begins to flux, the PTFE powder and antioxidants are loaded. The time required for melt mixing is about 4 minutes. The prepared concentrated PTFE (20%) nucleating agent MB is diluted into to a 10% PTFE MB on an 18 millimeter (mm) twin screw extruder (TSE-18) for a second mixing step to achieve the desired dispersion of the PTFE nucleating agent in the polyethylene matrix.

The polymeric matrix is formed into a foam through the use of a blowing agent. Preferably, the blowing agent is carbon dioxide ($CO_2$). In one instance, the polymeric matrix is foamed by placing the polymeric matrix in a vessel with $CO_2$ at a temperature above ambient and a pressure above ambient followed by rapidly lowering the pressure of the vessel. In one instance, the blowing agent is super-critical $CO_2$. The critical pressure for $CO_2$ is 7.4 MPa. In one instance, the desired pressure in the vessel is from 25 to 35 MPa. In one instance, the desired temperature in the vessel is from 111° C. to 130° C. for the polymeric matrix where high density polyethylene forms to the backbone.

The compositions of Comparative Example 1 and Example 1 along with the dispersion efficiency and particle size of the PTFE nucleating agent, and various cell properties of the foamed product are reported in Table 1.

TABLE 1

Comparison of Nucleating Agents

| Component | Comp. Ex. 1 MB-1 | Ex. 1 MB-2 |
|---|---|---|
| Nucleating agent MB | | |
| LDPE-1, wt % | 88.5 | 88.5 |
| PTFE-1, wt % | 10 | |
| PTFE-2, wt % | | 10 |
| Antioxidant, wt % | 1.5 | 1.5 |
| | 100 | 100 |
| Foamable compounds | | |
| LDPE-2, wt % | 20 | 20 |
| HDPE, wt % | 79 | 79 |
| Nucleating agent MB, wt % | 1 | |
| Nucleating agent MB, wt % | | 1 |
| | 100 | 100 |
| Nucleating agent MB | | |
| PTFE Dispersion efficiency | fair | excellent |
| Particle size in polymer matrix | 0.5-10 micron | 220 nm |
| Foaming properties | | |
| Cell uniformity | fair | excellent |
| Average cell size, micron | 30 | 23 |
| Cell size range, micron | 19.0-100.0 | 18.8-30.4 |

Characterization of Extruded Foam Rod
Expansion Ratio

The expansion ratio is calculated based on the density of sample before and after foaming. The density of the foamed article and solid plaque are measured according to ASTM D792.

Expansion ratio=$(1-\rho_{foam}/\rho_{solid})*100\%$

Average Cell Size

The foamed sample is fractured utilizing liquid nitrogen and then slices are cut out using a razor blade. The slices are coated with platinum using an EMITECH™ K575X coater before scanning electron microscopy (SEM) analysis. The SEM images are acquired on a FEI Nova NanoSEM 630 SEM by Everhart-Thornley detector (ETD) and Through Lens Detector (TLD) at an accelerating voltage of 5 kV, working distance around 6.5 mm and spot size of 5. The average cell size is obtained through the analysis of the SEM photographs.

The cell density of the foamed article can be calculated by the following Equation:

$$N_f = \left(\frac{n_c M_c^2}{A_c}\right)^{3/2}$$

$N_f$ represents cell number per cubic centimeter volume in the foamed article, $n_c$ is the cell number in the view area of SEM picture, $A_c$ is the area of SEM picture, and $M_c$ is the magnification.

D, which is the average the cell size, can be calculated by the following Equation:

$$D = \left(\frac{6V_t^2}{\pi N_f}\right)^{1/3}$$

Where, $V_t$ represents that expansion ratio of foamed article.
Results

Figure 1B:
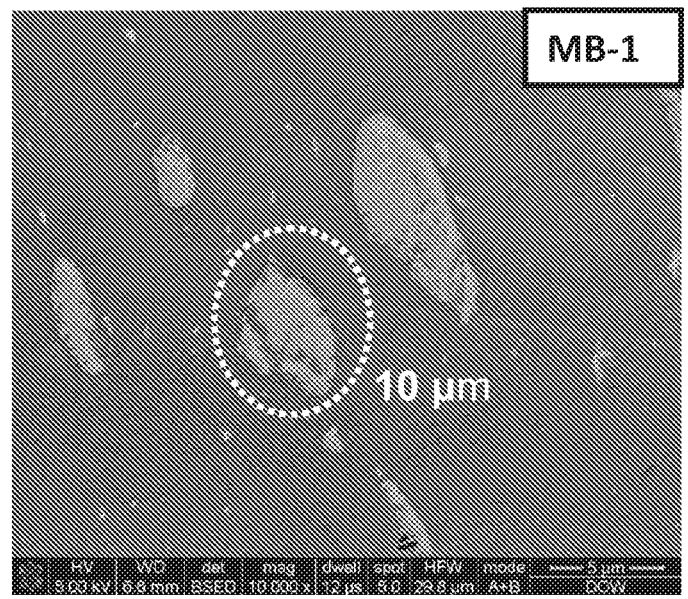
FIG. 1B is a SEM image of the composition prepared in Comparative Example 1 and comprising agglomerated PTFE particles dispersed in a polyethylene matrix, many of the agglomerates greater than 1 micron in size.
Figure 2A:
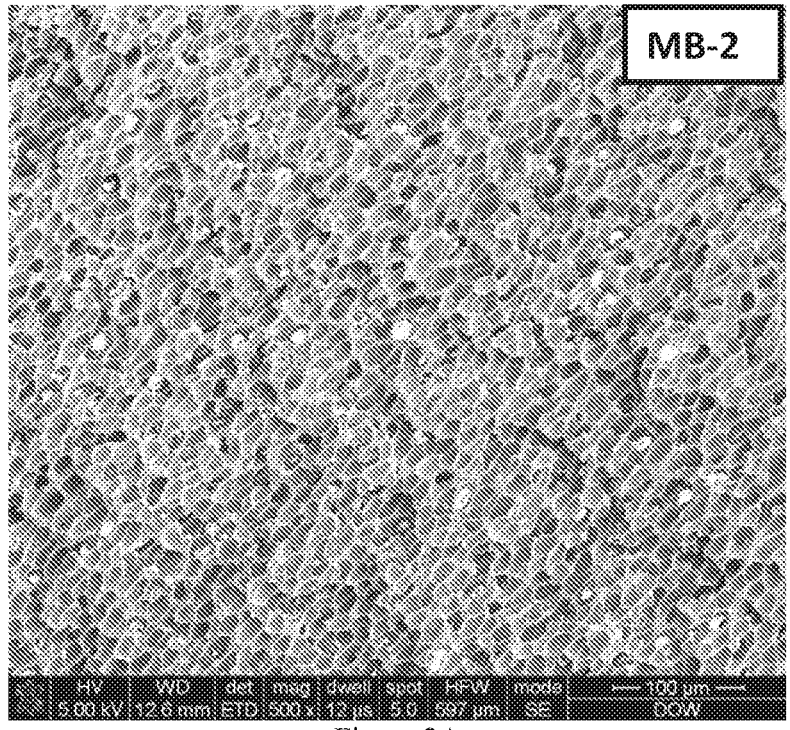
FIG. 2A is a SEM image of a foam prepared from the composition of Example 1.
Figure 2B:
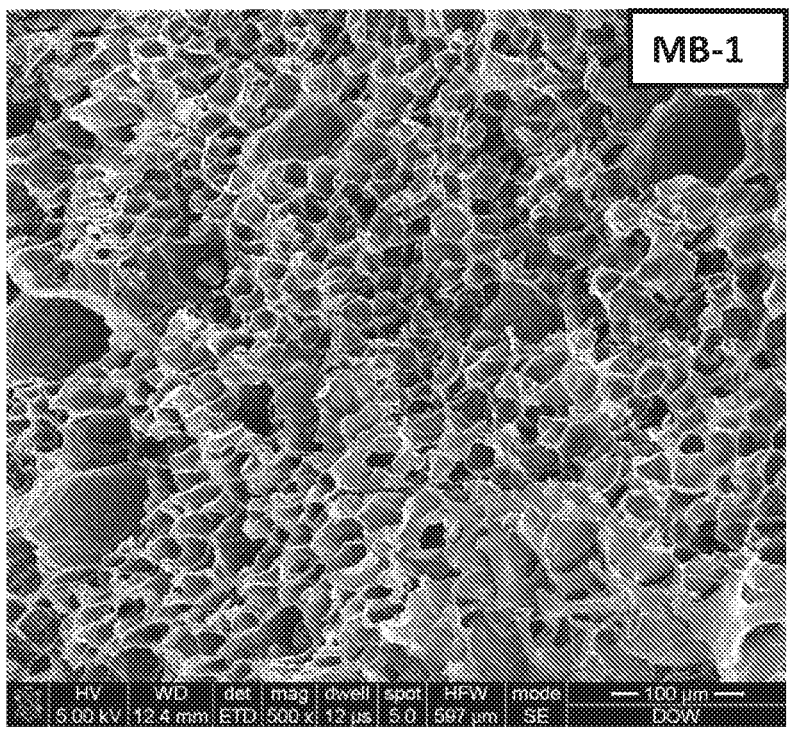
FIG. 2B is a SEM image of a foam prepared from the composition of Comparative Example 1.

FIGS. 1A and 1B are images from a scanning electron microscope showing that different initial particle morphologies that undergo the same mixing process result in different particle dispersions. The agglomerates of Example 1, initially consisting of sub-micron particles produced via dispersion polymerization are re-dispersed uniformly in the polymer matrix into small individual particles. The agglomerates of Comparative Example 1 are of equivalent size to those of Example 1 but are not homogeneously broken into small and uniform particles. The two nucleating agents lead to completely different foam structures as shown in FIGS. 2A and 2B.

Example 2

Extruder v. Batch Mixing

Compared to high intensity continuous mixers (twin-screw extruders, BUSS™ Kneader, Twin-rotor Farrel, JSW or Kobe machines), internal batch mixers are low intensity, low speed, i.e., low shear mixers with long mixing times (on the order of minutes). By contrast, continuous mixers operate at much higher speeds, i.e. higher shear rates and lower residence times (5 to 20 seconds is typical). The following experiment compares the effect of these two mixing regimes on the dispersion of the nucleator in the polymer matrix and on the resulting foamed product. The present findings can be attributed to a mixing regime that is lower shear but still high dispersive forces over a longer residence time to achieve a more homogeneous dispersion compared to high intensity, shorter mixing times.

Twin-Screw Extruder

A WERNER & PFLEIDERER™ ZSK-30, 11 barrels Twin-Screw extruder is used to prepare a 10 wt % PTFE dispersion in LDPE-2. The extruder was run at a relatively moderate speed of 100 rpm, the melt discharge temperature is 170° C.

BUSS™ Co-Kneader Batch Mixing

An MKS-70 BUSS™ (20 L/D) Co-Kneader is used to prepare a 10 wt % PTFE dispersion in LDPE-2. The machine is run at 250 rpm, and the melt discharge temperature is 191° C.

Results

Figure 3A:
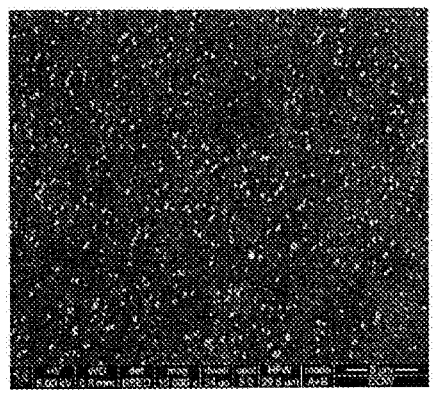
FIG. 3A is a SEM image of the composition prepared in Example 2 by batch mixing followed by mixing in a ZSK-30 twin-screw extruder and comprising PTFE submicron agglomerates and submicron unagglomerated particles dispersed in a polyethylene matrix.
Figure 3B:
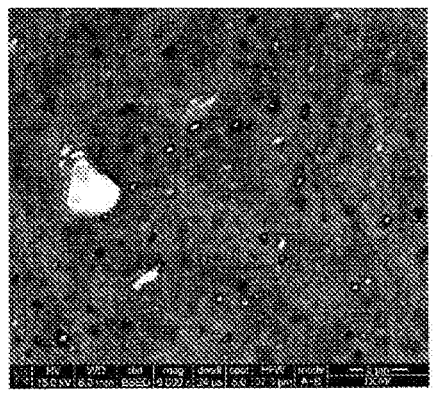
FIG. 3B is a SEM image of the composition prepared in Example 2 by mixing in a BUSS™ Co-Kneader and comprising PTFE agglomerates dispersed in a polyethylene matrix, some of the agglomerates exceeding 5 microns in size.

The best dispersion obtained is the one shown in FIG. 3A, and as seen, compared to the batch method described above and shown in FIG. 3B, the Buss dispersion shown in FIG. 3B contains large particles of 5 microns or greater, and also under same magnification, the small particles are larger compared to those in FIG. 3A.

Figure 3C:
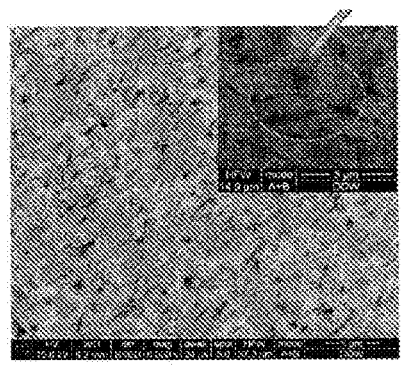
FIG. 3C is a SEM image of the composition prepared in Example 2 by mixing in a ZSK-30 twin-screw extruder and comprising PTFE submicron agglomerates and submicron unagglomerated particles dispersed in a polyethylene matrix.

The best dispersion is the one shown in FIG. 3C. On a first look, the dispersion appears reasonably uniform with no large particles, but a non-negligible number of elongated domains are visible. A closer examination under higher magnification (image insert), reveals the elongated needle-like domains appearing to be fibrillated PTFE, which are likely the result of compaction and fibrillation in the high intensity twin-screw extruder. Elongated fibril-like domains are not know to act as nucleating agents and therefore would not be desirable for the purpose of this invention.

What is claimed is:

1. A process for foaming a polyolefin composition, the process comprising the steps of:
    (A) preparing with batch mixing a masterbatch of a first low density polyethylene having a melt index from 0.1 g/10 min to 50 g/10 min, and a fluororesin powder composed of agglomerates and particles in which (1) the fluororesin powder comprises from 10 to 20 weight percent of the masterbatch, and (2) at least 80% of the fluororesin powder comprises agglomerates of submicron fluororesin particles, the agglomerates having a size from 5 microns to 20 microns, based on the total number of agglomerates and particles in the fluororesin powder,
    (B) reducing the size of the fluororesin agglomerates such that 80% or more of the fluroresin powder in the masterbatch comprises fluororesin agglomerates or fluororesin particles of a size less than 0.3 μm, based on the total number of agglomerates and particles in the fluororesin powder,
    (C) mixing the masterbatch of (B) with a polyolefin blend comprising (i) a high density polyethylene having a melt index from 0.1 g/10 min to 10 g/10 min and (ii) a second low density polyethylene that has a melt index that is different than the melt index of the first low density polyethylene, to form a mixture of the fluororesin powder substantially uniformly dispersed throughout the polyolefin blend, the mixture comprising
    from 60 wt % to 80 wt % of the high density polyethylene;
    from 19 wt % to 39 wt % of a combined amount of the first low density polyethylene and the second low density polyethylene; and
    from 0.1 wt % to 0.3 wt % fluororesin powder, based on the total weight of the mixture,
    (D) foaming the mixture of (C) to form a foam composition having a cell size range from 18.8 to 30.4 microns.

2. The process of claim 1 in which the fluororesin powder is prepared by dispersion polymerization.

3. The process of claim 2 in which the fluororesin powder comprises polytetrafluoroethylene (PTFE).

4. The process of claim 3 in which the masterbatch of (B) further comprises at least one of an antioxidant and a cell stabilizer.

5. The process of claim 1 comprising forming the foam composition to have an average cell size of 23 microns.

6. The process of claim 1 wherein the (B) reducing comprises batch mixing the masterbatch of (A) at a temperature of 120° C. and a mixer loading speed of 35 revolutions per minute for a period of about 4 minutes.

7. The process of claim 6 wherein the (B) reducing further comprises extruding the masterbatch after batch mixing.

8. The process of claim 1 comprising (B) reducing the size of the fluororesin particles or fluororesin agglomerates to a size of 220 nm.

* * * * *